(12) United States Patent
Xie et al.

(10) Patent No.: US 11,706,079 B2
(45) Date of Patent: Jul. 18, 2023

(54) FAULT RECOVERY METHOD AND APPARATUS, AND STORAGE MEDIUM

(71) Applicant: HUAWEI TECHNOLOGIES CO., LTD., Shenzhen (CN)

(72) Inventors: Yuming Xie, Nanjing (CN); Liang Zhang, Nanjing (CN); Wei Song, Nanjing (CN); Lei Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 117 days.

(21) Appl. No.: 17/184,772

(22) Filed: Feb. 25, 2021

(65) Prior Publication Data
US 2021/0273844 A1 Sep. 2, 2021

(30) Foreign Application Priority Data
Feb. 29, 2020 (CN) .......................... 202010132989.7

(51) Int. Cl.
*H04L 12/24* (2006.01)
*H04L 41/0631* (2022.01)
(Continued)

(52) U.S. Cl.
CPC ...... *H04L 41/0631* (2013.01); *H04L 41/0627* (2013.01); *H04L 41/0654* (2013.01); *H04L 41/12* (2013.01)

(58) Field of Classification Search
CPC ......... H04L 41/00; H04L 41/04; H04L 41/06; H04L 41/0613; H04L 41/0618;
(Continued)

(56) References Cited

U.S. PATENT DOCUMENTS 6,336,138 B1 * 1/2002 Caswell ................ H04L 43/091
709/224
6,654,914 B1 * 11/2003 Kaffine ................ H04Q 3/0075
714/41
(Continued)

FOREIGN PATENT DOCUMENTS

CN 103973496 A 8/2014
CN 110135604 A 8/2019
(Continued)

OTHER PUBLICATIONS

ETSI GS ENI 001 V3.0.4 (Nov. 2019), Experiential Networked Intelligence( ENI); ENI use cases, total 105 pages.
(Continued)

*Primary Examiner* — Boris D Grijalva Lobos
(74) *Attorney, Agent, or Firm* — Maier & Maier, PLLC

(57) ABSTRACT

A fault recovery method and apparatus, and a storage medium are provided, and belong to the field of Internet technologies. In the method, network composition information and abnormal event information of a target network are obtained, where the network composition information includes a network topology of the target network and device information of a plurality of network devices on the target network, and the device information includes one or more of interface configuration information, protocol configuration information, and service configuration information; and then a possible root cause of a fault of the target network is determined based on the network composition information and the abnormal event information, where the possible root cause of the fault is used to determine a corresponding fault recovery plan.

20 Claims, 5 Drawing Sheets

(51) Int. Cl.
*H04L 41/0604* (2022.01)
*H04L 41/0654* (2022.01)
*H04L 41/12* (2022.01)

(58) Field of Classification Search
CPC ............. H04L 41/0627; H04L 41/0631; H04L 41/065; H04L 41/0654; G06F 11/00; G06F 11/006; G06F 11/07; G06F 11/30; G06F 11/3051; G06F 11/3058
See application file for complete search history.

(56) References Cited

U.S. PATENT DOCUMENTS

| | | | |
|---|---|---|---|
| 2011/0264956 A1* | 10/2011 | Ito | G06F 11/0748 714/E11.147 |
| 2017/0033974 A1* | 2/2017 | Shashank | H04L 41/0631 |
| 2017/0126475 A1* | 5/2017 | Mahkonen | H04L 43/0864 |
| 2018/0367412 A1* | 12/2018 | Sethi | H04L 41/40 |
| 2019/0356535 A1 | 11/2019 | Li et al. | |
| 2019/0361759 A1* | 11/2019 | Haugen | H04L 41/0677 |
| 2020/0204428 A1* | 6/2020 | Sasidharan | G06F 11/0793 |
| 2021/0126851 A1* | 4/2021 | Chisholm | G06F 9/45558 |
| 2021/0168020 A1* | 6/2021 | Gerstel | H04L 47/822 |
| 2021/0295183 A1* | 9/2021 | Joy | G06N 20/00 |
| 2022/0200844 A1* | 6/2022 | Wang | H04L 41/0631 |

FOREIGN PATENT DOCUMENTS

| | | |
|---|---|---|
| CN | 110266552 A | 9/2019 |
| CN | 110609759 A | 12/2019 |
| CN | 107171819 B | 2/2020 |
| CN | 110855502 A | 2/2020 |
| CN | 110855503 A | 2/2020 |
| CN | 112183758 A | 1/2021 |
| CN | 112491636 A | 3/2021 |
| CN | 112529204 A | 3/2021 |
| CN | 112787841 A | 5/2021 |
| EP | 3 796 176 A1 | 3/2021 |
| JP | 2004363946 A | 12/2004 |
| WO | 2010122604 A1 | 10/2010 |
| WO | 2014534661 A | 12/2014 |

OTHER PUBLICATIONS

ETSI GS ENI 001 V2.1.1 (Sep. 2019), Experiential Networked Intelligence (ENI); ENI use cases, total 92 pages.

ITU-T E.475, Series E: Overall Network Operation, Telephone Service, Service Operation and Human Factors; Network management—Checking the quality of the international telephone service; Guidelines for intelligent network analytics and diagnostics, Jan. 2020, total 42 pages.

Donghui et al., "The new iMaster NCE-FabricInsight becomes a sharp knife for data center network intelligent operation and maintenance", Mar. 13, 2020, total 3 pages including an English-language machine translation.

Liang Cong, "Example and Discussion of Troubleshooting of Route Unreachable Using Routing Policy and Route Leakage", CATV Technology, 2015, 4 pages (with an English abstract).

* cited by examiner

FAULT RECOVERY METHOD AND APPARATUS, AND STORAGE MEDIUM

CROSS-REFERENCE TO RELATED APPLICATIONS

This application claims priority to Chinese Patent Application No. 202010132989.7, filed on Feb. 29, 2020, which is hereby incorporated by reference in its entirety.

TECHNICAL FIELD

The embodiments relate to the field of Internet technologies, and in particular, to a fault recovery method and apparatus, and a storage medium.

BACKGROUND

A network fault is a state in which a network cannot provide normal services or a quality of service is degraded due to a hardware problem, a software vulnerability, or other causes. Common network faults mainly include a physical layer fault, a data link layer fault, a network layer fault, an Ethernet fault, a wide area network fault, a transmission control protocol (TCP)/Internet protocol (IP) fault, a server fault, other service faults, and the like.

Currently, network fault recovery is mainly performed by an operation and maintenance person by focusing on alarm monitoring. Specifically, a monitoring person discovers a fault through alarm monitoring and dispatches a ticket. After the ticket is dispatched, a maintenance person performs fault diagnosis by using management functions, log analysis, and expert experience. After the fault is determined, the maintenance person selects and evaluates emergency recovery measures, and finally performs network fault recovery.

However, with an increasing network scale, a quantity of alarms is also increasing exponentially, even by millions per day. It is very difficult for an operation and maintenance person to identify a fault in massive alarms. In this case, fault identification consumes a large amount of time and workforce, thereby extending a mean time to diagnose (MTTD) and resulting in comparatively low efficiency of network fault recovery.

SUMMARY

The embodiments provide a fault recovery method and apparatus, and a storage medium, to address comparatively low efficiency of network fault recovery in a related technology. The solutions are as follows.

According to a first aspect, a fault recovery method is provided. In the method, network composition information and abnormal event information of a target network are obtained, where the network composition information includes a network topology of the target network and device information of a plurality of network devices on the target network, and the device information includes one or more of interface configuration information, protocol configuration information, and service configuration information; and a possible root cause of a fault of the target network is determined based on the network composition information and the abnormal event information, where the possible root cause of the fault is used to determine a corresponding fault recovery plan.

Optionally, the device information further includes a routing entry and/or a forwarding entry.

In this embodiment, fault detection is automatically implemented based on the network composition information, and the fault recovery plan can be automatically given accordingly, so that accuracy and efficiency of network fault recovery can be greatly improved.

Optionally, the determining of a possible root cause of a fault of the target network based on the network composition information and the abnormal event information includes: inputting the network composition information and the abnormal event information to a root cause locating model to obtain the possible root cause of the fault of the target network.

In this embodiment, the possible root cause of the fault can be automatically obtained, through analysis, from the abnormal event information based on the network composition information and by using the root cause locating model, thereby improving a speed and accuracy of locating the possible root cause of the fault.

In a possible implementation, after the determining a possible root cause of a fault of the target network based on the network composition information and the abnormal event information, the method further includes: sending the possible root cause of the fault to a control device; receiving an accuracy marking that corresponds to the possible root cause of the fault and that is sent by the control device, where the accuracy marking is used to identify that the possible root cause of the fault is accurate; and generating a training sample used to update the root cause locating model, where the training sample includes the network composition information and the abnormal event information, and a label of the training sample is the possible root cause of the fault.

In this embodiment, during network fault recovery, automatic root cause feedback is implemented to automatically optimize the root cause locating model, so that performance of the root cause locating model can be continuously improved, and accuracy of an output result of the root cause locating model can be improved.

In a possible implementation, after the determining of a possible root cause of a fault of the target network based on the network composition information and the abnormal event information, the method further includes: obtaining the fault recovery plan corresponding to the possible root cause of the fault; and after effectiveness of the fault recovery plan for a network fault is determined, generating a training sample used to update the root cause locating model, where the training sample includes the network composition information and the abnormal event information, and a label of the training sample is the possible root cause of the fault.

In this embodiment, during network fault recovery, automatic root cause feedback is implemented to automatically optimize the root cause locating model, so that performance of the root cause locating model can be continuously improved, and accuracy of an output result of the root cause locating model can be improved.

Optionally, the obtaining of network composition information and abnormal event information of a target network includes: obtaining the network composition information and network status information of the target network; and determining the abnormal event information of the target network in the network status information based on the network composition information.

Optionally, the determining of the abnormal event information of the target network in the network status information based on the network composition information includes: inputting the network composition information and the network status information to an anomaly identification model to obtain the abnormal event information. The network status information includes one or more of a log, an alarm, a key performance indicator (KPI) value, and an abnormal status of a data flow link setup packet.

In this embodiment, the abnormal event information can be automatically determined, through cluster analysis, in the network status information based on the network composition information and by using the anomaly identification model, thereby improving a speed and accuracy of discovering the abnormal event information.

Optionally, a fault level corresponding to the possible root cause of the fault may be further obtained from a correspondence between a possible root cause of a fault and a fault level. Then the fault level may be displayed, so that a person of ordinary skill may learn of a severity of a current network fault in a timely manner.

According to a second aspect, a fault recovery apparatus is provided. The apparatus has a function of implementing the behavior in the fault recovery method in the first aspect. The fault recovery apparatus includes at least one module. The at least one module is configured to implement the fault recovery method provided in the first aspect.

According to a third aspect, a fault recovery apparatus is provided. A structure of the fault recovery apparatus includes a processor and a memory. The memory is configured to store a program that supports the fault recovery apparatus in performing the fault recovery method provided in the first aspect, and store data used for implementing the fault recovery method in the first aspect. The processor is configured to execute the program stored in the memory. The fault recovery apparatus may further include a communications bus. The communications bus is configured to establish a connection between the processor and the memory.

According to a fourth aspect, a computer-readable storage medium is provided. The computer-readable storage medium stores an instruction. When the instruction runs on a computer, the computer is enabled to perform the fault recovery method in the first aspect.

According to a fifth aspect, a computer program product including an instruction is provided. When the computer program product runs on a computer, the computer is enabled to perform the fault recovery method in the first aspect.

According to a sixth aspect, a fault recovery method is provided. In the method, a possible root cause, sent by an analysis device, of a fault of a target network is received, where the possible root cause of the fault is determined by the analysis device based on network composition information and abnormal event information, the network composition information includes a network topology of the target network and device information of a plurality of network devices on the target network, and the device information includes one or more of interface configuration information, protocol configuration information, and service configuration information; and a determined fault recovery plan that corresponds to the possible root cause of the fault is obtained.

In this embodiment, fault detection is automatically implemented based on the network composition information, and the fault recovery plan can be automatically given accordingly, so that accuracy and efficiency of network fault recovery can be greatly improved.

Optionally, after the possible root cause, sent by the analysis device, of the fault of the target network is received, the fault recovery plan corresponding to the possible root cause of the fault may be further obtained; after effectiveness of the fault recovery plan for a network fault is determined, an accuracy marking corresponding to the possible root cause of the fault is generated, where the accuracy marking is used to identify that the possible root cause of the fault is accurate; and the accuracy marking corresponding to the possible root cause of the fault is sent to the analysis device.

In this embodiment, during network fault recovery, automatic root cause feedback is implemented, to automatically optimize a root cause locating model and/or an anomaly identification model, so that performance of the root cause locating model and/or the anomaly identification model can be continuously improved, and accuracy of an output result of the root cause locating model and/or the anomaly identification model can be improved.

Optionally, the method further includes: obtaining a fault level corresponding to the possible root cause of the fault from a correspondence between a possible root cause of a fault and a fault level. Then the fault level may be displayed, so that a person of ordinary skill may learn of a severity of a current network fault in a timely manner.

According to a seventh aspect, a fault recovery apparatus is provided. The apparatus has a function of implementing the behavior in the fault recovery method in the sixth aspect. The fault recovery apparatus includes at least one module. The at least one module is configured to implement the fault recovery method provided in the sixth aspect.

According to an eighth aspect, a fault recovery apparatus is provided. A structure of the fault recovery apparatus includes a processor and a memory. The memory is configured to store a program that supports the fault recovery apparatus in performing the fault recovery method provided in the sixth aspect, and store data used for implementing the fault recovery method in the sixth aspect. The processor is configured to execute the program stored in the memory. The fault recovery apparatus may further include a communications bus. The communications bus is configured to establish a connection between the processor and the memory.

According to a ninth aspect, a computer-readable storage medium is provided. The computer-readable storage medium stores an instruction. When the instruction runs on a computer, the computer is enabled to perform the fault recovery method in the sixth aspect.

According to a tenth aspect, a computer program product including an instruction is provided. When the computer program product runs on a computer, the computer is enabled to perform the fault recovery method in the sixth aspect.

Effects achieved by the second aspect, the third aspect, the fourth aspect, and the fifth aspect are similar to those achieved by corresponding manners in the first aspect. Effects achieved by the seventh aspect, the eighth aspect, the ninth aspect, and the tenth aspect are similar to those achieved by corresponding manners in the sixth aspect. Details are not described herein again.

DETAILED DESCRIPTION OF THE EMBODIMENTS

To make the objectives, solutions, and advantages of the embodiments clearer, the following further describes the implementations in detail with reference to the accompanying drawings.

A system architecture in the embodiments is described before the embodiments are described in detail.

Figure 1:
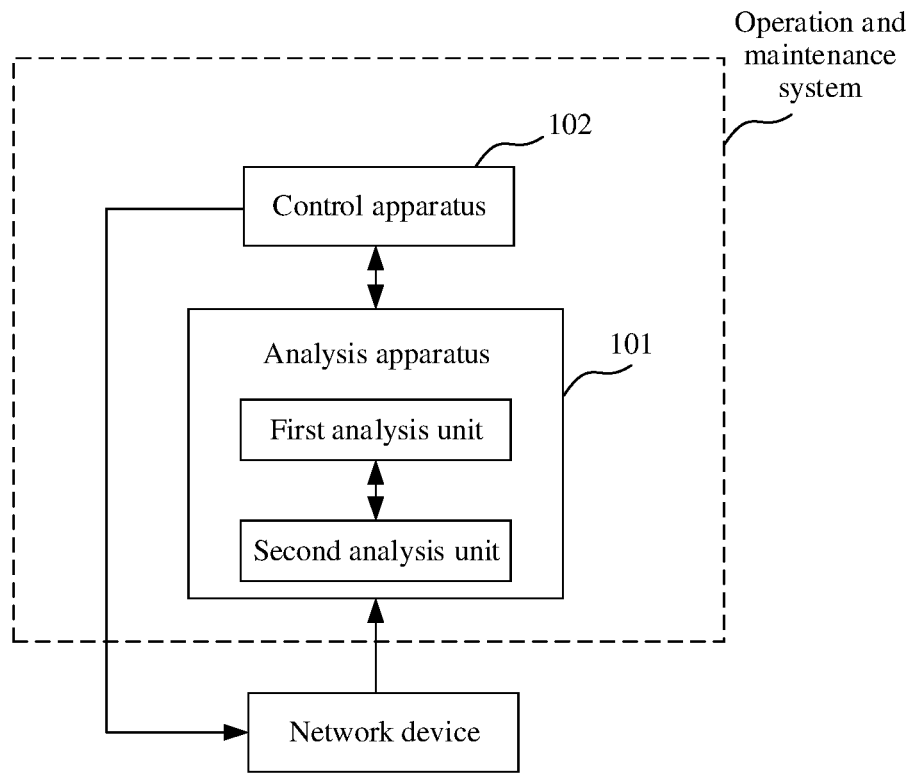
FIG. 1 is a schematic diagram of an operation and maintenance system according to an embodiment.

FIG. 1 is a schematic diagram of an operation and maintenance system according to an embodiment. Referring to FIG. 1, the operation and maintenance system includes an analysis device 101 and a control device 102.

The analysis device 101 may communicate with a network device through a wireless network or a wired network. The control device 102 may communicate with the network device through a wireless network or a wired network. The analysis device 101 may communicate with the control device 102 through a wireless network or a wired network.

The network device may have a data forwarding function, for example, the network device may be a switch, a router, or another device. The network device may exchange information with the analysis device 101, for example, the network device may negotiate on a data collection capability and report data.

The analysis device 101 may include a first analysis unit and a second analysis unit. The first analysis unit and the second analysis unit may be integrated in one physical device as two components or may be separately disposed in two physical devices as two independent units. The first analysis unit is configured to discover a fault, and the second analysis unit is configured to locate the fault.

The control device 102 may exchange information with the analysis device 101 and the network device. The control device 102 may formulate a fault recovery plan based on the fault located by the analysis device 101 and deliver the fault recovery plan to the network device. For example, the control device may be an access controller (AC).

The following describes functions of the network device, the analysis device 101, and the control device 102 in detail.

(1) Network Device:

The network device negotiates with the analysis device 101 on the data collection capability. The data collection capability may include a data collection period, data collection precision, a data compression algorithm, a data encryption algorithm, and the like.

The network device collects network composition information and network status information of a target network and reports the information to the analysis device 101. The network composition information includes a network topology of the target network and device information of a plurality of network devices on the target network. The device information includes one or more of interface configuration information, protocol configuration information (for example, open shortest path first (OSPF) configuration information), and service configuration information, and may further include a routing entry and/or a forwarding entry, and the like. The network status information may include a log, an alarm, a key performance indicator (KPI) value, an abnormal status of a data flow link setup packet, or the like.

(2) Analysis Device 101:

The analysis device 101 is configured to perform fault detection, that is, determine a possible root cause of a fault of the target network based on the network composition information, and send the possible root cause of the fault to the control device 102.

The first analysis unit is configured to discover a fault, that is, discover abnormal event information. For example, the first analysis unit may determine the abnormal event information of the target network in the network status information based on the network composition information, and may send a fault discovery result (that is, the abnormal event information) to the second analysis unit.

The second analysis unit is configured to locate the fault, that is, locate the possible root cause of the fault. For example, the second analysis unit may determine the possible root cause of the fault of the target network based on the network composition information and the abnormal event information and may send a fault locating result (that is, the possible root cause of the fault) to the control device 102.

Control Device 102:

The control device 102 obtains the fault recovery plan based on the possible root cause of the fault and delivers the fault recovery plan to the network device. The network device performs network fault recovery according to the fault recovery plan. In addition, the control device 102 may further automatically determine a fault level, analyze impact of the fault recovery plan on services, and the like.

The following describes in detail a fault recovery method provided in the embodiments.

Figure 2:
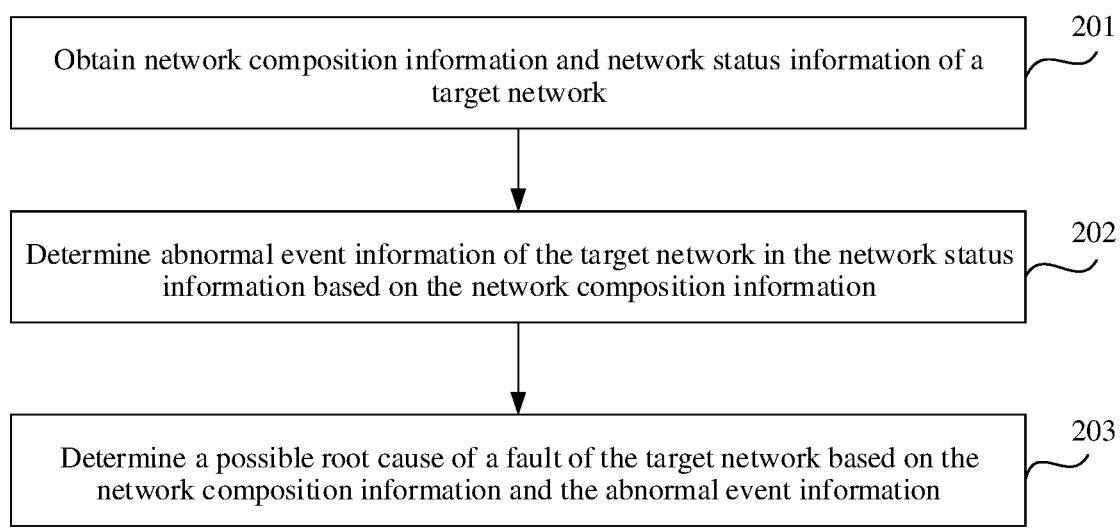
FIG. 2 is a flowchart of a fault recovery method according to an embodiment.

FIG. 2 is a flowchart of a fault recovery method according to an embodiment. The method is applied to the operation and maintenance system shown in FIG. 1. Referring to FIG. 2, the method includes the following steps.

Step 201: Obtain network composition information and network status information of a target network.

It should be noted that the target network is a network on which network fault detection needs to be performed. The network composition information includes a network topology of the target network and device information of a plurality of network devices on the target network. The device information includes one or more of interface configuration information, protocol configuration information (for example, OSPF configuration information), and service configuration information, and may further include a routing entry and/or a forwarding entry, and the like. This is not limited in this embodiment.

In addition, the network status information may include one or more of a log, an alarm, a KPI value (including a latency, a throughput, a packet loss rate, port utilization, a quantity of forwarded bytes, and the like), an abnormal status of a data flow link setup packet, and the like. This is not limited in this embodiment.

Further, the network status information may include a first type of network status information and a second type of network status information. The first type of network status information may be generated due to a network exception, that is, the first type of network status information itself is comparatively abnormal information, and the first type of network status information usually includes redundant information. For example, the first type of network status information may be an alarm or an abnormal status of a data flow link setup packet. A large quantity of alarms usually include many redundant alarms, for example, alarms not related to network faults, and repeated alarms. Whether an alarm is related to a network fault may be determined by using an alarm type. A large quantity of abnormal statuses of data flow link setup packets usually include many redundant abnormal statuses of data flow link setup packets, for example, repeated abnormal statuses of data flow link setup packets. The second type of network status information changes significantly when a network is abnormal, and is comparatively stable when the network is normal, that is, the second type of network status information may include information indicating that an exception occurs. When the network is abnormal, there is a comparatively high possibility that the second type of network status information includes information indicating that an exception occurs. When the network is normal, there is a comparatively low possibility that the second type of network status information includes information indicating that an exception occurs. For example, the second type of network status information may be a log or a KPI value. The log may include an exception log, for example, an uncommon type of log. The KPI value may include an abnormal KPI value, for example, a KPI value subject to a sudden change (for example, a sudden increase or a sudden decrease).

Both the network composition information and the network status information may be actively reported by a network device to the operation and maintenance system. The network composition information may be collected and reported by the network device at regular intervals. The network status information may be collected and reported by the network device in real time.

To help the network device normally report the network composition information and the network status information to the operation and maintenance system, before step 201, the network device and the operation and maintenance system may negotiate on a data collection capability in advance. The data collection capability may be a rule related to data collection and transmission, for example, the data collection capability may include a data collection period, data collection precision, a data compression algorithm, and a data encryption algorithm.

The network device and the operation and maintenance system may negotiate on the data collection capability in a plurality of manners. In a possible manner, the operation and maintenance system may preconfigure a rule related to data collection and transmission, and deliver the rule to the network device, and the network device synchronously configures the rule, so that the network device may subsequently report the network composition information and the network status information to the operation and maintenance system according to the rule. Additionally, the network device and the operation and maintenance system may alternatively negotiate on the data collection capability in another manner. This is not limited in this embodiment.

Step 202: Determine abnormal event information of the target network in the network status information based on the network composition information.

It should be noted that the network device usually reports a large amount of network status information. Only a part of the network status information may be abnormal event information that is truly related to a network fault. Therefore, the abnormal event information that is truly related to the network fault needs to be extracted from the network status information first.

For example, the abnormal event information may be shown in Table 1 below.

TABLE 1

| Time | Location | Name | ... |
|------|----------|------|-----|
| Time 1 | Location 1 | Name 1 | ... |
| Time 2 | Location 2 | Name 2 | ... |
| ... | ... | ... | ... |

Each row in Table 1 is used to record a piece of abnormal event information. A time in Table 1 may be a time when abnormal event information is collected. A location in Table 1 may be an identifier of an interface or a device that collects the abnormal event information (for example, the identifier may be an Internet protocol (IP) address). A name in Table 1 is an information name of the abnormal event information and is used to uniquely identify the abnormal event information.

It should be noted that Table 1 is only used as an example to describe the abnormal event information in this embodiment of this application, but Table 1 does not constitute a limitation on this embodiment.

For example, the network composition information and the network status information may be input to an anomaly identification model to obtain the abnormal event information. Alternatively, for the first type of network status information in the network status information, aggregation analysis may be performed on the first type of network status information based on the network composition information to obtain abnormal event information; and for the second type of network status information in the network status information, the network composition information and the second type of network status information may be input to the anomaly identification model to obtain abnormal event information. Alternatively, for any network status information in the second type of network status information, when the network status information is greater than a preset threshold, it may be determined that the network status information is abnormal event information. Additionally, the abnormal event information of the target network may be alternatively determined in the network status information based on the network composition information in another manner. This is not limited in this embodiment.

It should be noted that, after aggregation analysis is performed on the first type of network status information, redundant information in the first type of network status information can be filtered out, thereby greatly reducing an amount of network status information. After the redundant information in the first type of network status information is filtered out, remaining network status information is abnormal event information that can be subsequently used to locate a root cause.

Aggregation analysis may be performed on the first type of network status information based on the network composition information in a plurality of manners. In a possible manner, a similarity between network status information in the first type of network status information may be determined based on the network composition information, and network status information with a higher similarity may be aggregated into one piece of network status information. In another possible manner, whether a network exception reflected by network status information in the first type of network status information matches the network composition information may be determined, and non-matching network status information may be deleted. Additionally, aggregation analysis may be alternatively performed on the first type of network status information based on the network composition information in another manner. This is not limited in this embodiment.

It should be noted that the anomaly identification model is used to identify the abnormal event information in the network status information. An unsupervised algorithm or a supervised algorithm may be used for the anomaly identification model. For example, an unsupervised algorithm such as anomaly detection based on a dynamic baseline may be used, or a supervised algorithm such as a decision tree or a convolutional neural network may be used. The anomaly identification model may be obtained through training by using a large quantity of samples including abnormal event information under different network compositions. For example, a plurality of training samples may be determined in advance. For any one of the plurality of training samples, sample data of the training sample includes network composition information and network status information, and the network status information is collected on a target network indicated by the network composition information. A sample label of the training sample is abnormal event information in the network status information. Then the plurality of training samples may be used to perform model training to obtain the anomaly identification model. For example, sample data of the plurality of training samples may be used as input, and sample labels of the plurality of training samples may be used as expected output, to perform model training.

In addition, after network composition information and network status information are input to the anomaly identification model, the anomaly identification model may extract, from the network status information, abnormal event information that is very likely to be generated on a target network indicated by the network composition information, and output the abnormal event information.

It should be noted that, in this embodiment, the abnormal event information can be automatically determined, through cluster analysis, in the network status information based on the network composition information and by using the anomaly identification model, thereby improving a speed and accuracy of discovering the abnormal event information.

It should be noted that, in this embodiment, the network composition information and the abnormal event information of the target network may be obtained by using step 201 and step 202. Further, the network composition information and the abnormal event information of the target network may be alternatively obtained in another manner. This is not limited in this embodiment. After the network composition information and the abnormal event information of the target network are obtained, fault locating may be performed accordingly. A specific process is as follows.

Step 203: Determine a possible root cause of a fault of the target network based on the network composition information and the abnormal event information.

It should be noted that the possible root cause of the fault may be network status information arising from a true fault point. With an increasing network scale, an amount of abnormal event information is also increasing exponentially, even by millions per day. However, an amount of abnormal event information arising from true fault points may be actually less than one thousand or even less than one hundred. Therefore, a possible root cause of a fault needs to be determined in a large amount of abnormal event information, so that network maintenance can be accurately performed based on the possible root cause of the fault subsequently.

In addition, the possible root cause of the fault is used to determine a corresponding fault recovery plan, and the fault recovery plan may be used for network fault recovery. The possible root cause of the fault may be a piece of abnormal event information in the abnormal event information or may be obtained through inference based on the abnormal event information.

For example, the possible root cause of the fault may be shown in Table 2 below.

TABLE 2

| Time | Location | Name | ... |
|---|---|---|---|
| Time 3 | Location 3 | Name 3 | ... |
| Time 2 | Location 2 | Name 2 | ... |
| ... | ... | ... | ... |

Each row in Table 2 is used to record a possible root cause of a fault. A time in Table 2 may be a time when a possible root cause of a fault is collected. A location in Table 2 may be an identifier of an interface or a device that collects the possible root cause of the fault (for example, the identifier may be an IP address). A name in Table 2 is a root cause name of the possible root cause of the fault and is used to uniquely identify the possible root cause of the fault. The root cause name of the possible root cause of the fault may be an information name of the possible root cause of the fault. Alternatively, the root cause name of the possible root cause of the fault may be a name that can reflect a true fault point indicated by the possible root cause of the fault. For example, the root cause name of the possible root cause of the fault may be a layer 2 loop fault.

It should be noted that Table 2 is only used as an example to describe the possible root cause of the fault in this embodiment, but Table 2 does not constitute a limitation on this embodiment.

For example, the possible root cause of the fault of the target network may be determined based on the network composition information and the abnormal event information in a plurality of manners. For example, the possible root cause of the fault may be determined by using an expert rule, a fault propagation diagram, or a neural network. In a possible manner, the network composition information and the abnormal event information may be input to a root cause locating model to obtain the possible root cause of the fault of the target network.

It should be noted that the root cause locating model is used to locate a possible root cause of a fault in abnormal event information. An unsupervised algorithm or a supervised algorithm may be used for the root cause locating model. For example, correlation analysis, a convolutional neural network, a recurrent neural network, or a deep neural network may be used. The root cause locating model may be obtained through training by using a large quantity of samples including root causes under different network compositions. For example, a plurality of training samples may be determined in advance. For any one of the plurality of training samples, sample data of the training sample includes network composition information and abnormal event information, and the abnormal event information is collected on a target network indicated by the network composition information. A sample label of the training sample is a possible root cause of a fault in the abnormal event information. Then the plurality of training samples may be used to perform model training to obtain the root cause locating model. For example, sample data of the plurality of training samples may be used as input, and sample labels of the plurality of training samples may be used as expected output, to perform model training.

In addition, after network composition information and abnormal event information are input to the root cause locating model, the root cause locating model may extract, from the abnormal event information, abnormal event information that is very likely to arise from a true fault point on a target network indicated by the network composition information, and output the extracted abnormal event information as a possible root cause of a fault of the target network.

It should be noted that, in this embodiment, the possible root cause of the fault can be automatically obtained, through analysis, from the abnormal event information based on the network composition information and by using the root cause locating model, thereby improving a speed and accuracy of locating the possible root cause of the fault.

Further, after the possible root cause of the fault of the target network is obtained in step 203, network fault recovery may be performed accordingly. For example, the following two possible manners may be included.

First possible manner obtain the fault recovery plan corresponding to the possible root cause of the fault. For example, the fault recovery plan corresponding to the possible root cause of the fault may be obtained from a correspondence between a possible root cause of a fault and a fault recovery plan.

It should be noted that the correspondence between a possible root cause of a fault and a fault recovery plan may be set in advance. In the correspondence, a fault recovery plan corresponding to each possible root cause of a fault is used for recovery of a true fault point corresponding to the possible root cause of the fault. The recovery may include, but is not limited to, recovery by restarting a port, a board, or a device, modifying a configuration, or the like. In this way, the fault recovery plan can be quickly obtained from the correspondence based on the possible root cause of the fault, so that efficiency and accuracy of fault recovery can be improved.

It should be noted that, in this embodiment, both the fault recovery plan and other information related to fault recovery can be obtained. For example, a fault level may be automatically determined, and impact of the fault recovery plan on services may be analyzed.

In an example, after the possible root cause of the fault is obtained, a fault level corresponding to the possible root cause of the fault may be obtained from a correspondence between a possible root cause of a fault and a fault level. Then the fault level may be displayed, so that a person of ordinary skill may learn of a severity of a current network fault in a timely manner.

It should be noted that the correspondence between a possible root cause of a fault and a fault level may be set in advance. In the correspondence, a fault level corresponding to each possible root cause of a fault is used to indicate a fault severity of a true fault point corresponding to the possible root cause of the fault.

In an example, after the fault recovery plan is obtained, impact to be exerted on service performance after the fault recovery plan is implemented may be determined based on the network composition information; or impact to be exerted on service performance after the fault recovery plan is implemented may be determined based on the network composition information and the possible root cause of the fault.

It should be noted that, after the impact to be exerted on the service performance after the fault recovery plan is implemented is determined, the impact to be exerted on the service performance after the fault recovery plan is implemented may be displayed, so that a person of ordinary skill may learn of the impact of the fault recovery plan on the service performance in a timely manner, and further select a comparatively appropriate fault recovery plan for network fault recovery accordingly, to ensure that the network fault recovery can be implemented with comparatively small impact on the service performance.

The impact to be exerted on the service performance after the fault recovery plan is implemented may be determined based on the network composition information in a plurality of manners. For example, the network composition information and the fault recovery plan may be input to a first impact analysis model, to obtain the impact to be exerted on the service performance after the fault recovery plan is implemented. Additionally, the impact to be exerted on the service performance after the fault recovery plan is implemented may be alternatively determined based on the network composition information in another manner. This is not limited in this embodiment.

In addition, the first impact analysis model is used to analyze impact to be exerted on service performance after a fault recovery plan is implemented. An unsupervised algorithm or a supervised algorithm may be used for the first impact analysis model. For example, correlation analysis, a convolutional neural network, a recurrent neural network, or a deep neural network may be used. The first impact analysis model may be obtained through training by using a large quantity of samples including service impact caused after fault recovery plans are implemented under different network compositions. For example, a plurality of training samples may be determined in advance. For any one of the plurality of training samples, sample data of the training sample includes network composition information and a fault recovery plan. A sample label of the training sample is impact on service performance, and the impact on the service performance is collected after the fault recovery plan is implemented on a target network indicated by the network composition information. Then the plurality of training samples may be used to perform model training to obtain the first impact analysis model. For example, sample data of the plurality of training samples may be used as input, and sample labels of the plurality of training samples may be used as expected output, to perform model training.

In addition, after the network composition information and the fault recovery plan are input to the first impact analysis model, the first impact analysis model may analyze impact to be exerted on service performance after the fault recovery plan is implemented on the target network indicated by the network composition information, and then output an analysis result.

The impact to be exerted on the service performance after the fault recovery plan is implemented may be determined based on the network composition information and the possible root cause of the fault in a plurality of manners. For example, the network composition information, the possible root cause of the fault, and the fault recovery plan may be input to a second impact analysis model, to obtain the impact to be exerted on the service performance after the fault recovery plan is implemented. Further, the impact to be exerted on the service performance after the fault recovery plan is implemented may be alternatively determined based on the network composition information and the possible root cause of the fault in another manner. This is not limited in this embodiment.

In addition, the second impact analysis model is used to analyze impact to be exerted on service performance after a fault recovery plan is implemented. An unsupervised algorithm or a supervised algorithm may be used for the second impact analysis model. For example, correlation analysis, a convolutional neural network, a recurrent neural network, or a deep neural network may be used. The second impact analysis model may be obtained through training by using a large quantity of samples including service impact caused after fault recovery plans are implemented under different network compositions and different possible root causes of faults. For example, a plurality of training samples may be determined in advance. For any one of the plurality of training samples, sample data of the training sample includes network composition information, a possible root cause of a fault, and a fault recovery plan. A sample label of the training sample is impact on service performance, and the impact on the service performance is collected after the fault recovery plan is implemented on a target network indicated by the network composition information when the target network has the possible root cause of the fault. Then the plurality of training samples may be used to perform model training to obtain the second impact analysis model. For example, sample data of the plurality of training samples may be used as input, and sample labels of the plurality of training samples may be used as expected output, to perform model training.

In addition, after the network composition information, the possible root cause of the fault, and the fault recovery plan are input to the second impact analysis model, the second impact analysis model may analyze impact to be exerted on service performance after the fault recovery plan is implemented when the target network indicated by the network composition information has the possible root cause of the fault, and then output an analysis result.

Further, after the fault recovery plan is obtained, the fault recovery plan may be further implemented. For example, the fault recovery plan may be manually implemented by a person of ordinary skill or automatically implemented by an operation and maintenance system.

In a possible manner, the fault recovery plan may be displayed first; when a confirmation instruction for the fault recovery plan is received, the fault recovery plan is sent to the network device; and the network device performs network fault recovery according to the fault recovery plan. In this way, the fault recovery plan is implemented after confirmation is obtained from a person of ordinary skill, so that network fault recovery is more accurate.

The confirmation instruction is used to confirm that the fault recovery plan is to be implemented. The confirmation instruction may be triggered by a person of ordinary skill, and the person of ordinary skill may trigger the confirmation instruction by using an operation such as a click operation, a gesture operation, a voice operation, or a somatosensory operation. For example, a plan implementation button may be displayed on a management interface, and the person of ordinary skill may trigger the confirmation instruction by clicking the plan implementation button.

In another possible manner, the fault recovery plan may be directly sent to the network device, and the network device performs network fault recovery according to the fault recovery plan. In this way, after the fault recovery plan is obtained, the fault recovery plan may be directly implemented, so that efficiency of network fault recovery can be improved.

In still another possible manner, when the fault level corresponding to the possible root cause of the fault is greater than a preset level, the fault recovery plan may be sent to the network device, and the network device performs network fault recovery according to the fault recovery plan.

The preset level may be set in advance. When the fault level corresponding to the possible root cause of the fault is greater than the preset level, it indicates that a network fault is comparatively serious. Therefore, in this case, the network device may be indicated to perform network fault recovery as soon as possible according to the fault recovery plan, to ensure normal operating of a network.

In yet another possible manner, when the fault level corresponding to the possible root cause of the fault is less than or equal to a preset level, the fault recovery plan may be displayed; when a confirmation instruction for the fault recovery plan is received, the fault recovery plan is sent to the network device; and the network device performs network fault recovery according to the fault recovery plan. In this way, when a network fault is not too serious, confirmation is obtained from a person of ordinary skill first, and then the fault recovery plan is implemented, so that network fault recovery is more accurate.

It should be noted that, in this embodiment, a function of one-click rollback after the fault recovery plan is implemented may be further set. In other words, if a cancellation instruction for the fault recovery plan is received after the fault recovery plan is sent to the network device, a cancellation message may be sent to the network device to indicate the network device to cancel implementation of the fault recovery plan. In this way, the fault recovery plan can be conveniently implemented and cancelled, so that network fault recovery is more flexible.

The cancellation instruction is used to cancel implementation of the fault recovery plan. The cancellation instruction may be triggered by a person of ordinary skill, and the person of ordinary skill may trigger the cancellation instruction by using an operation such as a click operation, a gesture operation, a voice operation, or a somatosensory operation. For example, a plan cancellation button may be displayed on the management interface, and the person of ordinary skill may trigger the cancellation instruction by clicking the plan cancellation button.

Further, after effectiveness of the fault recovery plan for a network fault is determined, a training sample used to update the root cause locating model may be further generated. The training sample includes the network composition information and the abnormal event information. When the possible root cause of the fault is abnormal event information, a label of the training sample is the possible root cause of the fault; or when the possible root cause of the fault is obtained through inference based on abnormal event information, a label of the training sample is the abnormal event information used to infer the possible root cause of the fault.

It should be noted that the determining effectiveness of the fault recovery plan for a network fault may be estimating the effectiveness of the fault recovery plan for the network fault before the fault recovery plan is implemented, or may be determining the effectiveness of the fault recovery plan for the network fault based on a recovery status of the network fault after the fault recovery plan is actually implemented.

In addition, after the effectiveness of the fault recovery plan for the network fault is determined, it indicates that the possible root cause of the fault is truly generated on the target network. Therefore, the network composition information, the abnormal event information, and the possible root cause of the fault may be used to generate a training sample to update the root cause locating model. In this way, during network fault recovery, automatic root cause feedback is implemented, to automatically optimize the root cause locating model, so that performance of the root cause locating model can be continuously improved, and accuracy of an output result of the root cause locating model can be improved.

Further, after the effectiveness of the fault recovery plan for the network fault is determined, a training sample used to update the anomaly identification model may be further generated. The training sample includes the network composition information and the network status information. When the possible root cause of the fault is abnormal event information, a label of the training sample is the possible root cause of the fault; or when the possible root cause of the fault is obtained through inference based on abnormal event information, a label of the training sample is the abnormal event information used to infer the possible root cause of the fault.

It should be noted that, after the effectiveness of the fault recovery plan for the network fault is determined, it indicates that the possible root cause of the fault is truly generated on the target network. Therefore, the network composition information, the network status information, and the possible root cause of the fault may be used to generate a training sample to update the anomaly identification model. In this way, during network fault recovery, automatic root cause feedback is implemented, to automatically optimize the anomaly identification model, so that performance of the anomaly identification model can be continuously improved, and accuracy of an output result of the anomaly identification model can be improved.

Second possible manner send the possible root cause of the fault to a control device; receive an accuracy marking that corresponds to the possible root cause of the fault and that is sent by the control device, where the accuracy marking is used to identify that the possible root cause of the fault is accurate; and generate a training sample used to update the root cause locating model, where the training sample includes the network composition information and the abnormal event information.

When the possible root cause of the fault is abnormal event information, a label of the training sample is the possible root cause of the fault; or when the possible root cause of the fault is obtained through inference based on abnormal event information, a label of the training sample is the abnormal event information used to infer the possible root cause of the fault.

It should be noted that, after the accuracy marking corresponding to the possible root cause of the fault is received, it may be determined that the possible root cause of the fault is accurate. Therefore, the network composition information, the abnormal event information, and the possible root cause of the fault may be used to generate a training sample to update the root cause locating model. In this way, during network fault recovery, automatic root cause feedback is implemented, to automatically optimize the root cause locating model, so that performance of the root cause locating model can be continuously improved, and accuracy of an output result of the root cause locating model can be improved.

Further, after the accuracy marking that corresponds to the possible root cause of the fault and that is sent by the control device is received, a training sample used to update the anomaly identification model may be further generated. The training sample includes the network composition information and the network status information.

When the possible root cause of the fault is abnormal event information, a label of the training sample is the possible root cause of the fault; or when the possible root cause of the fault is obtained through inference based on abnormal event information, a label of the training sample is the abnormal event information used to infer the possible root cause of the fault.

In this way, during network fault recovery, automatic root cause feedback is implemented, to automatically optimize the anomaly identification model, so that performance of the anomaly identification model can be continuously improved, and accuracy of an output result of the anomaly identification model can be improved.

The following describes a processing process after the control device receives the possible root cause of the fault.

For example, after receiving the possible root cause of the fault, the control device may obtain, from a correspondence between a possible root cause of a fault and a fault recovery plan, the fault recovery plan corresponding to the possible root cause of the fault.

It should be noted that, in this embodiment, the control device may obtain both the fault recovery plan and other information related to fault recovery. For example, the control device may automatically determine a fault level, and analyze impact of the fault recovery plan on services.

In an example, the control device may obtain, from a correspondence between a possible root cause of a fault and a fault level, a fault level corresponding to the possible root cause of the fault, and then may display the fault level, so that a person of ordinary skill may learn of a severity of a current network fault in a timely manner.

In an example, the control device may determine, based on the network composition information, impact to be exerted on service performance after the fault recovery plan is implemented; or may determine, based on the network composition information and the possible root cause of the fault, impact to be exerted on service performance after the fault recovery plan is implemented.

It should be noted that, after the impact to be exerted on the service performance after the fault recovery plan is implemented is determined, the impact to be exerted on the service performance after the fault recovery plan is implemented may be displayed, so that a person of ordinary skill may learn of the impact of the fault recovery plan on the service performance in a timely manner, and further select a comparatively appropriate fault recovery plan for network fault recovery accordingly, to ensure that the network fault recovery can be implemented with comparatively small impact on the service performance.

Further, after obtaining the fault recovery plan, the control device may further implement the fault recovery plan. For example, the fault recovery plan may be manually implemented by a person of ordinary skill or automatically implemented by an operation and maintenance system. A specific implementation is the same as the foregoing first possible manner and is not described in detail again in this embodiment.

It should be noted that, in this embodiment, a function of one-click rollback after the fault recovery plan is implemented may be further set. For example, if the control device receives a cancellation instruction for the fault recovery plan after sending the fault recovery plan to the network device, the control device may send a cancellation message to the network device to indicate the network device to cancel implementation of the fault recovery plan. In this way, the fault recovery plan can be conveniently implemented and cancelled, so that network fault recovery is more flexible.

Further, after determining effectiveness of the fault recovery plan for a network fault, the control device may further generate an accuracy marking corresponding to the possible root cause of the fault.

It should be noted that, after the effectiveness of the fault recovery plan for the network fault is determined, it indicates that the possible root cause of the fault is truly generated on the target network. Therefore, accuracy of the possible root cause of the fault may be marked.

In this embodiment, the network composition information and the abnormal event information of the target network are obtained, where the network composition information includes the network topology of the target network and the device information of the plurality of network devices on the target network, and the device information includes one or more of the interface configuration information, the protocol configuration information, and the service configuration information; and then the possible root cause of the fault of the target network is determined based on the network composition information and the abnormal event information, where the possible root cause of the fault is used to determine the corresponding fault recovery plan. In this way, fault detection is automatically implemented based on the network composition information, and the fault recovery plan can be automatically given accordingly, so that accuracy and efficiency of network fault recovery can be greatly improved.

Figure 3A:
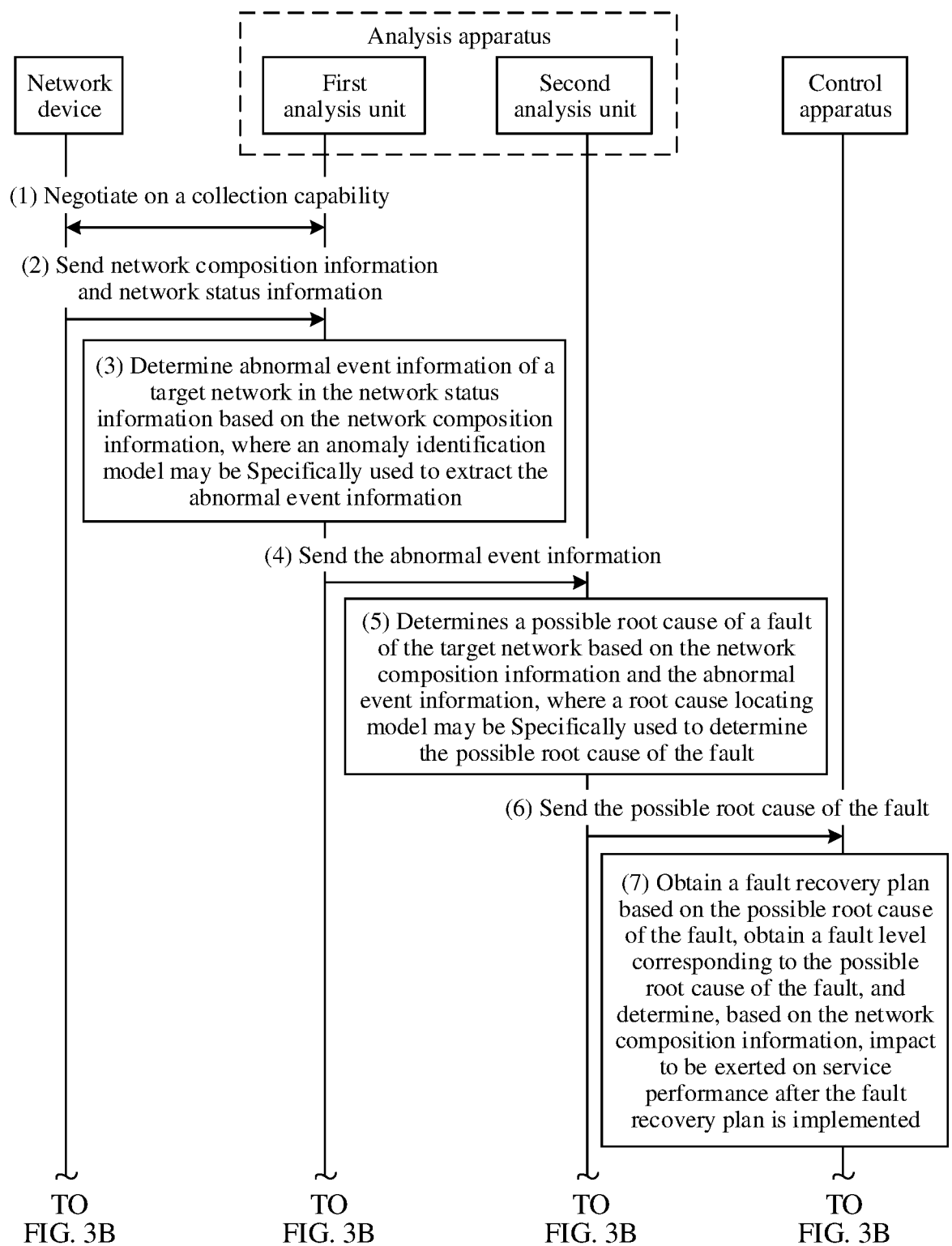
FIG. 3A and FIG. 3B are a flowchart of another fault recovery method according to an embodiment.
Figure 3B:
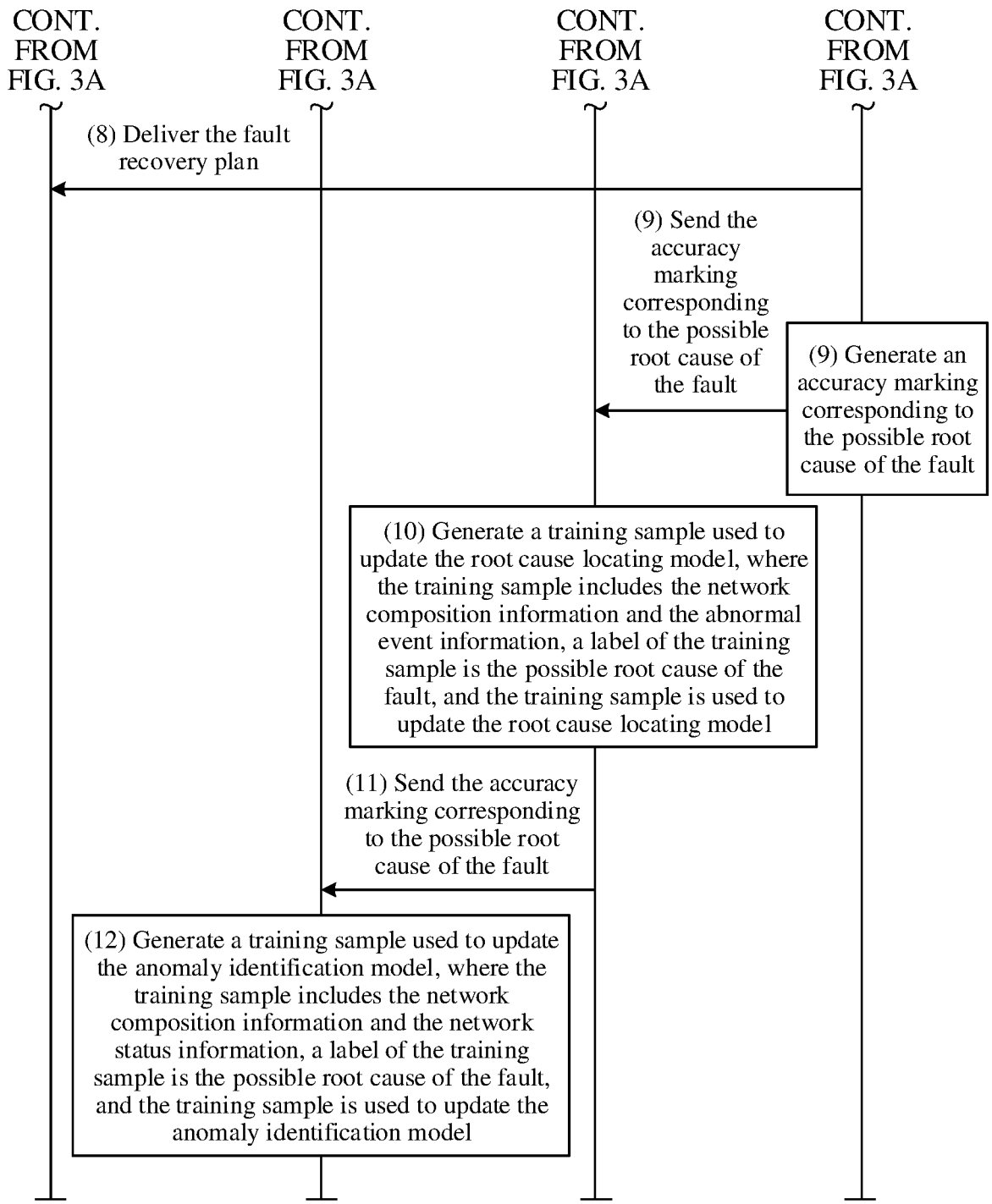

For ease of understanding, the following describes the foregoing fault recovery method by using an example with reference to FIG. 3A and FIG. 3B. Referring to FIG. 3A and FIG. 3B, a specific process of the fault recovery method is as follows.

(1) The network device negotiates with a first analysis unit in an analysis device on a data collection capability.

(2) The network device reports the network composition information and the network status information of the target network to the first analysis unit.

(3) The first analysis unit determines the abnormal event information of the target network in the network status information based on the network composition information. For example, the anomaly identification model may be used to extract the abnormal event information.

(4) The first analysis unit sends the abnormal event information to a second analysis unit in the analysis device.

(5) The second analysis unit determines the possible root cause of the fault of the target network based on the network composition information and the abnormal event information. For example, the root cause locating model may be used to determine the possible root cause of the fault.

(6) The second analysis unit sends the possible root cause of the fault to the control device.

(7) The control device obtains the fault recovery plan based on the possible root cause of the fault, obtains the fault level corresponding to the possible root cause of the fault, and determines, based on the network composition information, the impact to be exerted on the service performance after the fault recovery plan is implemented.

(8) The control device delivers the fault recovery plan to the network device.

(9) The control device generates the accuracy marking corresponding to the possible root cause of the fault, and sends the accuracy marking corresponding to the possible root cause of the fault to the second analysis unit.

(10) The second analysis unit generates the training sample used to update the root cause locating model. The training sample includes the network composition information and the abnormal event information. The label of the training sample is the possible root cause of the fault. The training sample is used to update the root cause locating model.

(11) The second analysis unit sends the accuracy marking corresponding to the possible root cause of the fault to the first analysis unit.

(12) The first analysis unit generates the training sample used to update the anomaly identification model. The training sample includes the network composition information and the network status information. The label of the training sample is the possible root cause of the fault. The training sample is used to update the anomaly identification model.

Figure 4:
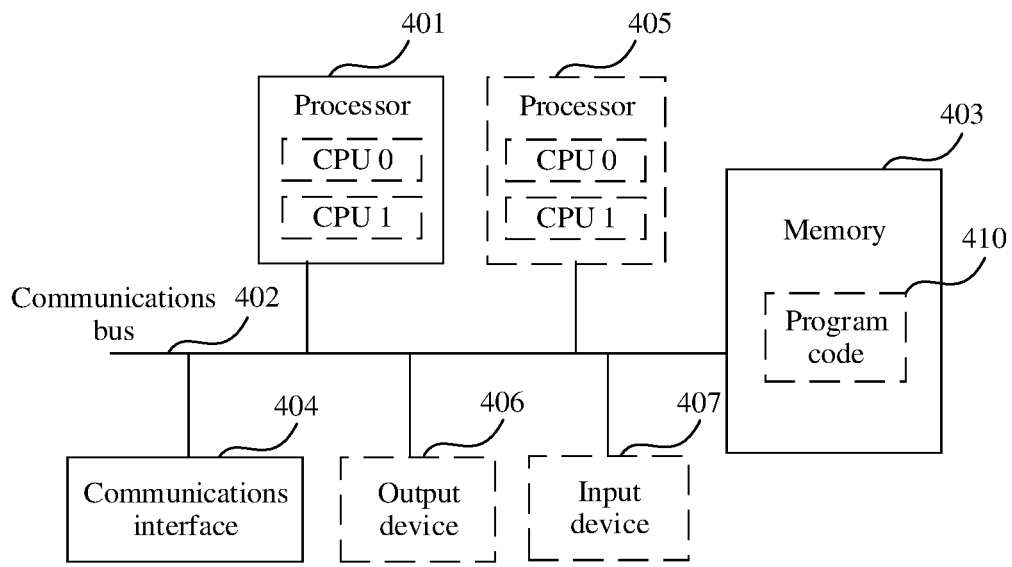
FIG. 4 is a schematic structural diagram of a computer device according to an embodiment.

FIG. 4 is a schematic structural diagram of a computer device according to an embodiment. The operation and maintenance system shown in FIG. 1 may be implemented by the computer device. Referring to FIG. 4, the computer device includes at least one processor 401, a communications bus 402, a memory 403, and at least one communications interface 404.

The processor 401 may be a microprocessor (including a central processing unit (CPU), or the like) or an application-specific integrated circuit (ASIC), or may be one or more integrated circuits configured to control execution of programs in the solutions and embodiments.

The communications bus 402 may include a channel for transmitting information between the foregoing components.

The memory 403 may be a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this does not constitute a limitation herein. The memory 403 may exist independently and is connected to the processor 401 by using the communications bus 402. Alternatively, the memory 403 may be integrated with the processor 401.

The communications interface 404 is configured to communicate, by using any apparatus like a transceiver, with another device or a communications network, for example, Ethernet, a radio access network (RAN), or a wireless local area network (WLAN).

In a specific implementation, in an embodiment, the processor 401 may include one or more CPUs, for example, a CPU 0 and a CPU 1 shown in FIG. 4.

In a specific implementation, in an embodiment, the computer device may include a plurality of processors, for example, a processor 401 and a processor 405 shown in FIG. 4. Each of the processors may be a single-core processor, or may be a multi-core processor. The processor herein may be one or more devices, a circuit, and/or a processing core configured to process data (for example, a computer program instruction).

In a specific implementation, in an embodiment, the computer device may further include an output device 406 and an input device 407. The output device 406 communicates with the processor 401, and may display information in a plurality of manners. For example, the output device 406 may be a liquid crystal display (LCD), a light emitting diode (LED) display device, a cathode ray tube (CRT) display device, or a projector (projector). The input device 407 communicates with the processor 401 and may receive user input in a plurality of manners. For example, the input device 407 may be a mouse, a keyboard, a touchscreen device, or a sensing device.

The computer device may be a general-purpose computer device or a dedicated computer device. In a specific implementation, the computer device may be a desktop computer, a portable computer, a network server, a palmtop computer, a mobile phone, a tablet computer, a wireless terminal device, a communications device, or an embedded device. A type of the computer device is not limited in this embodiment.

The memory 403 is configured to store program code 410 for executing the solutions and embodiments, and the processor 401 is configured to execute the program code 410 stored in the memory 403. The computer device may implement the fault recovery method provided in the embodiment of FIG. 2 by using the processor 401 and the program code 410 stored in the memory 403.

Figure 5:
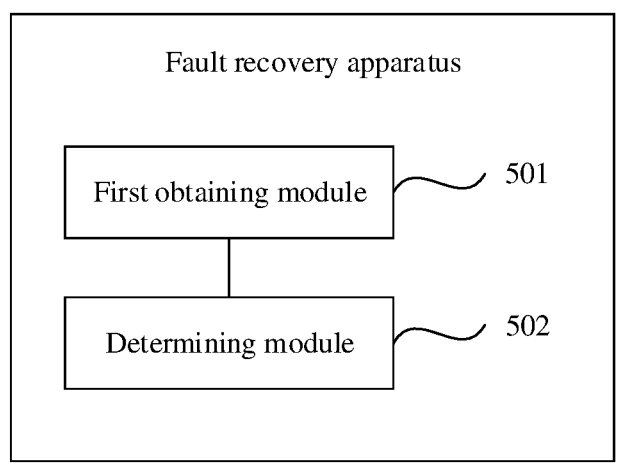
FIG. 5 is a schematic structural diagram of a fault recovery apparatus according to an embodiment.

FIG. 5 is a schematic structural diagram of a fault recovery apparatus according to an embodiment. The fault recovery apparatus may be implemented by software, hardware, or a combination of software and hardware to become a part or an entirety of a computer device. The computer device may be the computer device shown in FIG. 4 Referring to FIG. 5, the apparatus includes a first obtaining module 501 and a determining module 502.

The first obtaining module 501 is configured to obtain network composition information and abnormal event information of a target network. The network composition information includes a network topology of the target network and device information of a plurality of network devices on the target network. The device information includes one or more of interface configuration information, protocol configuration information, and service configuration information.

The determining module 502 is configured to determine a possible root cause of a fault of the target network based on the network composition information and the abnormal event information. The possible root cause of the fault is used to determine a corresponding fault recovery plan.

Optionally, the device information further includes a routing entry and/or a forwarding entry.

Optionally, the determining module 502 is configured to:
input the network composition information and the abnormal event information to a root cause locating model to obtain the possible root cause of the fault of the target network.

Optionally, the apparatus further includes:
a sending module configured to send the possible root cause of the fault to a control device;
a receiving module configured to receive an accuracy marking that corresponds to the possible root cause of the fault and that is sent by the control device, where the accuracy marking is used to identify that the possible root cause of the fault is accurate; and
a first generation module configured to generate a training sample used to update the root cause locating model, where the training sample includes the network composition information and the abnormal event information, and a label of the training sample is the possible root cause of the fault.

Optionally, the apparatus further includes:
a second obtaining module configured to obtain the fault recovery plan corresponding to the possible root cause of the fault; and a second generation module configured to: after effectiveness of the fault recovery plan for a network fault is determined, generate a training sample used to update the root cause locating model, where the training sample includes the network composition information and the abnormal event information, and a label of the training sample is the possible root cause of the fault.

Optionally, the first obtaining module 501 includes:
an obtaining unit configured to obtain the network composition information and network status information of the target network; and
a determining unit configured to determine the abnormal event information of the target network in the network status information based on the network composition information.

Optionally, the determining unit is configured to:
input the network composition information and the network status information to an anomaly identification model to obtain the abnormal event information.

Optionally, the network status information includes one or more of a log, an alarm, a KPI value, and an abnormal status of a data flow link setup packet.

Optionally, the apparatus further includes:
a third obtaining module configured to obtain a fault level corresponding to the possible root cause of the fault from a correspondence between a possible root cause of a fault and a fault level.

In this embodiment, after the network composition information and the network status information are obtained, anomaly detection is performed on the network status information based on the network composition information to obtain the abnormal event information. Then root cause analysis is performed on the abnormal event information based on the network composition information to obtain the possible root cause of the fault. Finally, the fault recovery plan is obtained based on the possible root cause of the fault. The fault recovery plan is used for network fault recovery. In this way, fault discovery and fault locating are automatically implemented based on the network composition information, and the fault recovery plan is automatically given accordingly, so that accuracy and efficiency of network fault recovery can be greatly improved.

Figure 6:
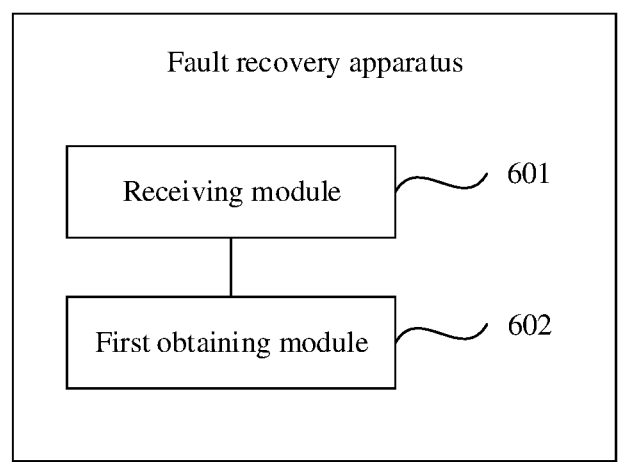
FIG. 6 is a schematic structural diagram of another fault recovery apparatus according to an embodiment.

FIG. 6 is a schematic structural diagram of a fault recovery apparatus according to an embodiment. The fault recovery apparatus may be implemented by software, hardware, or a combination of software and hardware to become a part or an entirety of a computer device. The computer device may be the computer device shown in FIG. 4 Referring to FIG. 6, the apparatus includes a receiving module 601, where the receiving module 601 is configured to receive a possible root cause, sent by an analysis device, of a fault of a target network, where the possible root cause of the fault is determined by the analysis device based on network composition information and abnormal event information, the network composition information includes a network topology of the target network and device information of a plurality of network devices on the target network, and the device information includes one or more of interface configuration information, protocol configuration information, and service configuration information; and
a first obtaining module 602 configured to obtain a determined fault recovery plan that corresponds to the possible root cause of the fault.

Optionally, the apparatus further includes:
a second obtaining module configured to obtain the fault recovery plan corresponding to the possible root cause of the fault;

a generation module, configured to: after effectiveness of the fault recovery plan for a network fault is determined, generate an accuracy marking corresponding to the possible root cause of the fault, where the accuracy marking is used to identify that the possible root cause of the fault is accurate; and a sending module configured to send, to the analysis device, the accuracy marking corresponding to the possible root cause of the fault.

Optionally, the apparatus further includes:

a third obtaining module configured to obtain a fault level corresponding to the possible root cause of the fault from a correspondence between a possible root cause of a fault and a fault level.

In this embodiment, after the network composition information and the network status information are obtained, anomaly detection is performed on the network status information based on the network composition information to obtain the abnormal event information. Then root cause analysis is performed on the abnormal event information based on the network composition information to obtain the possible root cause of the fault. Finally, the fault recovery plan is obtained based on the possible root cause of the fault. The fault recovery plan is used for network fault recovery. In this way, fault discovery and fault locating are automatically implemented based on the network composition information, and the fault recovery plan is automatically given accordingly, so that accuracy and efficiency of network fault recovery can be greatly improved.

It should be noted that, in the fault recovery apparatus provided in the foregoing embodiments, division of the foregoing functional modules is taken as an example for illustration. In practice, the functions may be allocated to different functional modules for implementation as required. For example, an internal structure of an apparatus is divided into different functional modules to implement all or part of the functions described above. In addition, the fault recovery apparatus provided in the foregoing embodiment and the embodiment of the fault recovery method belong to a same concept. For details about a specific implementation process of the fault recovery apparatus, refer to the method embodiment. Details are not described herein again.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The foregoing descriptions are merely embodiments, but are not limiting. Any modification, equivalent replacement, or improvement made without departing from the spirit and principle of the embodiments should fall within the protection scope.

What is claimed is:

1. A fault recovery method, comprising:
   obtaining network composition information and abnormal event information of a target network, wherein the network composition information comprises a network topology of the target network and device information of a plurality of network devices on the target network, and the device information comprises one or more of interface configuration information, protocol configuration information, and service configuration information;
   determining a possible root cause of a fault of the target network based on the network composition information and the abnormal event information;
   determining at least one fault recovery plan based on the possible root cause;
   determining, according to the network composition information or according to the network composition information and the possible root cause, impact on service performance after any fault recovery plan from the at least one fault recovery plan is implemented; and
   selecting, based on the impact on service performance and from the at least one fault recovery plan, a fault recovery plan for network fault recovery.

2. The method according to claim 1, wherein the device information further comprises at least one of a routing entry and a forwarding entry.

3. The method according to claim 1, wherein determining the possible root cause of the fault of the target network based on the network composition information and the abnormal event information further comprises:
   inputting the network composition information and the abnormal event information to a root cause locating model to obtain the possible root cause of the fault of the target network.

4. The method according to claim 1, wherein after determining the possible root cause of the fault of the target network based on the network composition information and the abnormal event information, the method further comprises:
   sending the possible root cause of the fault to a control device;
   receiving an accuracy marking that corresponds to the possible root cause of the fault and that is sent by the control device, wherein the accuracy marking is used to identify that the possible root cause of the fault is accurate; and
   generating a training sample used to update the root cause locating model, wherein the training sample comprises the network composition information and the abnormal event information, and a label of the training sample is the possible root cause of the fault.

5. The method according to claim 1, wherein after determining the possible root cause of the fault of the target network based on the network composition information and the abnormal event information, the method further comprises:
   obtaining the fault recovery plan corresponding to the possible root cause of the fault; and after effectiveness of the fault recovery plan for a network fault is determined, generating a training sample used to update the root cause locating model, wherein the training sample comprises the network composition information and the abnormal event information, and a label of the training sample is the possible root cause of the fault.

6. The method according to claim 1, wherein obtaining the network composition information and abnormal event information of the target network further comprises:
obtaining the network composition information and network status information of the target network; and
determining the abnormal event information of the target network in the network status information based on the network composition information.

7. The method according to claim 6, wherein determining the abnormal event information of the target network in the network status information based on the network composition information further comprises:
inputting the network composition information and the network status information to an anomaly identification model to obtain the abnormal event information.

8. The method according to claim 6, wherein the network status information comprises one or more of a log, an alarm, a key performance indicator (KPI) value, and an abnormal status of a data flow link setup packet.

9. The method according to claim 1, further comprising:
obtaining a fault level corresponding to the possible root cause of the fault from a correspondence between the possible root cause of the fault and the fault level.

10. An apparatus, comprising:
at least one processor; and
at least one memory, coupled to the at least one processor and configured to store instructions that when executed by the at least one processor cause the apparatus to:
obtain network composition information and abnormal event information of a target network, wherein the network composition information comprises a network topology of the target network and device information of a plurality of network devices on the target network, and the device information comprises one or more of interface configuration information, protocol configuration information, and service configuration information;
determine a possible root cause of a fault of the target network based on the network composition information and the abnormal event information;
determine at least one fault recovery plan based on the possible root cause;
determine, according to the network composition information or according to the network composition information and the possible root cause, impact on service performance after any fault recovery plan from the at least one fault recovery plan is implemented; and
select, based on the impact on service performance and from the at least one fault recovery plan, a fault recovery plan for network fault recovery.

11. The apparatus according to claim 10, wherein the device information further comprises at least one of a routing entry and a forwarding entry.

12. The apparatus according to claim 10, wherein, when executed by the at least one processor, the instructions further cause the apparatus to:
input the network composition information and the abnormal event information to a root cause locating model to obtain the possible root cause of the fault of the target network.

13. The apparatus according to claim 10, wherein, when executed by the at least one processor, the instructions further cause the apparatus to:
send the possible root cause of the fault to a control device;
receive an accuracy marking that corresponds to the possible root cause of the fault and that is sent by the control device, wherein the accuracy marking is used to identify that the possible root cause of the fault is accurate; and
generate a training sample used to update the root cause locating model, wherein the training sample comprises the network composition information and the abnormal event information, and a label of the training sample is the possible root cause of the fault.

14. The apparatus according to claim 10, wherein, when executed by the at least one processor, the instructions further cause the apparatus to:
obtain the fault recovery plan corresponding to the possible root cause of the fault; and
generate, after effectiveness of the fault recovery plan for a network fault is determined, a training sample used to update the root cause locating model, wherein the training sample comprises the network composition information and the abnormal event information, and a label of the training sample is the possible root cause of the fault.

15. The apparatus according to claim 10, wherein, when executed by the at least one processor, the instructions further cause the apparatus to:
obtain the network composition information and network status information of the target network, and
determine the abnormal event information of the target network in the network status information based on the network composition information.

16. The apparatus according to claim 15, wherein, when executed by the at least one processor, the instructions further cause the apparatus to:
input the network composition information and the network status information to an anomaly identification model to obtain the abnormal event information.

17. The apparatus according to claim 15, wherein the network status information comprises one or more of a log, an alarm, a key performance indicator (KPI) value, and an abnormal status of a data flow link setup packet.

18. An apparatus comprising:
at least one processor; and
at least one memory, coupled to the at least one processor and configured to store instructions that when executed by the at least one processor cause the apparatus to:
receive a possible root cause, sent by an analysis device, of a fault of a target network, wherein the possible root cause of the fault is determined by the analysis device based on network composition information and abnormal event information, the network composition information comprises a network topology of the target network and device information of a plurality of network devices on the target network, and the device information comprises one or more of interface configuration information, protocol configuration information, and service configuration information;

determine at least one fault recovery plan based on the possible root cause;

determine, according to the network composition information or according to the network composition information and the possible root cause, impact on service performance after any fault recovery plan from the at least one fault recovery plan is implemented; and select, based on the impact on service performance and from the at least one fault recovery plan, a fault recovery plan for network fault recovery.

19. The apparatus according to claim 18, wherein, when executed by the at least one processor, the instructions further cause the apparatus to:

generate, after effectiveness of the fault recovery plan for a network fault is determined, an accuracy marking corresponding to the possible root cause of the fault, wherein the accuracy marking is used to identify that the possible root cause of the fault is accurate; and send, to the analysis device, the accuracy marking corresponding to the possible root cause of the fault.

20. The apparatus according to claim 18, wherein, when executed by the at least one processor, the instructions further cause the apparatus to:

obtain a fault level corresponding to the possible root cause of the fault from a correspondence between the possible root cause of the fault and the fault level.

\* \* \* \* \*